United States Patent
Yoon et al.

(10) Patent No.: US 11,747,779 B2
(45) Date of Patent: Sep. 5, 2023

(54) ELECTRONIC APPARATUS AND CONTROL METHOD THEREOF

(71) Applicant: SAMSUNG ELECTRONICS CO., LTD., Suwon-si (KR)

(72) Inventors: Seungil Yoon, Suwon-si (KR); Minsup Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 132 days.

(21) Appl. No.: 17/123,956

(22) Filed: Dec. 16, 2020

(65) Prior Publication Data

US 2021/0181700 A1 Jun. 17, 2021

(30) Foreign Application Priority Data

Dec. 16, 2019 (KR) .................. 10-2019-0167581

(51) Int. Cl.
| | |
|---|---|
| H04L 12/28 | (2006.01) |
| G05B 19/042 | (2006.01) |
| G16Y 10/75 | (2020.01) |
| H04L 67/306 | (2022.01) |
| G16Y 40/30 | (2020.01) |

(52) U.S. Cl.
CPC ............ G05B 19/042 (2013.01); G16Y 10/75 (2020.01); G16Y 40/30 (2020.01); H04L 12/2816 (2013.01); H04L 67/306 (2013.01); G05B 2219/2642 (2013.01)

(58) Field of Classification Search
USPC ........................................................ 700/28
See application file for complete search history.

(56) References Cited

U.S. PATENT DOCUMENTS

| | | |
|---|---|---|
| 2006/0004576 A1 | 1/2006 | Kishida |
| 2012/0117590 A1 | 5/2012 | Agnihotri et al. |
| 2013/0321859 A1 | 12/2013 | Ohara |

(Continued)

FOREIGN PATENT DOCUMENTS

| | | |
|---|---|---|
| KR | 101632971 B1 | 6/2016 |
| KR | 1020160091624 A | 8/2016 |

(Continued)

OTHER PUBLICATIONS

International Search Report (PCT/ISA/210) and Written Opinion (PCT/ISA/237) issued by the International Searching Authority in International Application No. PCT/KR2020/018257, dated Mar. 15, 2021.

*Primary Examiner* — Emilio J Saavedra
(74) *Attorney, Agent, or Firm* — Sughrue Mion, PLLC

(57) ABSTRACT

An electronic apparatus including at least one interface; and at least one processor configured to: register a first user account with a first server configured to provide a first service, through the at least one interface, identify a second server corresponding to an external apparatus connectable through the at least one interface, wherein the second server is configured to provide a second service different from the first service, register the first user account with the second server through the at least one interface to link the first user account to a second user account corresponding to the second service, and perform a linkage service operation based on the first service and the second service, using the first user account and the second user account.

20 Claims, 10 Drawing Sheets

(56) References Cited

U.S. PATENT DOCUMENTS

2018/0205570 A1* 7/2018 Kang ................ H04L 12/2818
2019/0238358 A1* 8/2019 Hurewitz ................ H04W 4/70
2021/0132559 A1* 5/2021 Ni ........................ G05B 19/042

FOREIGN PATENT DOCUMENTS

| KR | 101717202 B1 | 3/2017 |
| KR | 101730881 B1 | 4/2017 |
| KR | 1020180102823 A | 9/2018 |
| WO | 2016/182912 A1 | 11/2016 |
| WO | 2019/221451 A1 | 11/2019 |

* cited by examiner

ELECTRONIC APPARATUS AND CONTROL METHOD THEREOF

CROSS-REFERENCE TO RELATED THE APPLICATION

This application is based on and claims priority under 35 U.S.C. § 119 to Korean Patent Application No. 10-2019-0167581 filed on Dec. 16, 2019 in the Korean Intellectual Property Office, the disclosure of which is incorporated by reference herein in its entirety.

BACKGROUND

Field

The disclosure relates to an electronic apparatus and a control method thereof under an Internet-of-things (IoT) system provided for controlling operations of a plurality of electronic apparatuses as connected to an access point (AP) and a server, and more particularly to an electronic apparatus and a control method thereof under the system when a new electronic apparatus is additionally used in the system.

Description of Related Art

To compute and process predetermined information in accordance with certain processes, an electronic apparatus may include a central processing unit (CPU), a chipset, a memory, and the like electronic components for the computation. Such an electronic apparatus may be variously classified in accordance with what information will be processed and what it is used for. For example, the electronic apparatus may be classified into an information processing apparatus such as a personal computer (PC), a server or the like for processing general information; an image processing apparatus for processing image data; an audio apparatus for audio process; home appliances for miscellaneous household chores; etc. The image processing apparatus may be embodied as a display apparatus that displays an image based on processed image data on its own display panel. Further, the electronic apparatus may be classified into a stationary type installed in one place, and a mobile type portable by a user according to use methods.

When a household is taken as an example, the household may own a plurality of miscellaneous electronic apparatuses such as a television (TV), a refrigerator, a washing machine, a mobile apparatus, etc. Like this, the electronic apparatus is closely grafted onto life of general users. With higher demands of users and corresponding development in performance of electronic apparatuses, a plurality of electronic apparatuses may not only operate independently of each other but also operate as interconnected with each other. Such an interconnection may be based on communication between the plurality of electronic apparatuses. In particular, a wireless communication method is applied to the communication in consideration of a mobile apparatus. However, when security is taken into account, wireless communication between the plurality of electronic apparatuses may be at risk. Therefore, it may be preferable in terms of security that a plurality of electronic apparatuses be registered to a unit network system to which a preset security protocol is applied to have communication connection.

Such a unit network may be capable of creating an IoT environment like a household's home network. However, it will get in trouble if a user can control operations of a TV or household appliances, control temperature of a boiler, release a door lock, turn on a light or carry out the like operations through an unauthorized unspecified mobile apparatus. In other words, the foregoing operations should be permitted to only the mobile apparatus registered to the server that manages the unit network, but not permitted to an unregistered mobile apparatus. Therefore, to use an electronic apparatus such as a mobile apparatus, etc. purchased by a user on the unit network, the user needs to go through a process of registering the purchased electronic apparatus to the server that manages the unit network.

SUMMARY

Additional aspects will be set forth in part in the description which follows and, in part, will be apparent from the description, or may be learned by practice of the presented embodiments.

In accordance with an aspect of the disclosure, an electronic apparatus includes at least one interface; and at least one processor configured to: register a first user account with a first server configured to provide a first service, through the at least one interface, identify a second server corresponding to an external apparatus connectable through the at least one interface, wherein the second server is configured to provide a second service different from the first service, register the first user account with the second server through the at least one interface to link the first user account to a second user account corresponding to the second service, and perform a linkage service operation based on the first service and the second service, using the first user account and the second user account.

The at least one processor may be further configured to: detect the external apparatus through the at least one interface, determine whether the first user account has been registered with the second server, and based on determining that the first user account is not registered with the second server, register the first user account with the second server.

The at least one processor may be further configured to: identify the external apparatus based on information about the external apparatus received from the external apparatus through the at least one interface.

The information about the external apparatus may include information about a manufacturer of the external apparatus, and the at least one processor may be further configured to identify the external apparatus based on the information about the manufacturer of the external apparatus.

The information about the external apparatus may further include a network address of the external apparatus, and the at least one processor may be further configured to identify the external apparatus based on the network address of the external apparatus and a network address table provided according to the manufacturer of the external apparatus.

The at least one processor may be further configured to: receive information about the second server from the external apparatus through the at least one interface, and identify the second server based on the received information about the second server.

The linkage service operation may include controlling the external apparatus.

The at least one processor may be further configured to perform the linkage service operation based on a control signal received from the external apparatus.

The linkage service operation may include controlling a second external apparatus connected to the second server through the external apparatus.

The at least one processor may be further configured to register the second user account with the second server through the at least one interface, based on a determination that the second user account obtained from the external apparatus has not been registered to the second server.

In accordance with an aspect of the disclosure, a method of controlling an electronic apparatus, includes registering a first user account with a first server configured to provide a first service; identifying a second server corresponding to a connectable external apparatus, wherein the second server is configured to provide a second service different from the first service; registering the first user account with the second server to link the first user account to a second user account corresponding to the second service; and performing a linkage service operation based on the first service and the second service, using the first user account and the second user account.

The method may further include: detecting the external apparatus; determining whether the first user account has been registered with the second server; and based on determining that the first user account is not registered with the second server, registering the first user account with the second server.

The method may further include: identifying the external apparatus based on information about the external apparatus received from the external apparatus.

The information about the external apparatus may include information about a manufacturer of the external apparatus, and the external apparatus may be identified based on the information about the manufacturer of the external apparatus.

The information about the external apparatus may further include a network address of the external apparatus, and the external apparatus may be identified based on the network address of the external apparatus and a network address table provided according to the manufacturer of the external apparatus.

The method may further include: receiving information about the second server from the external apparatus, and identifying the second server based on the received information about the second server.

The method may further include the linkage service operation may include controlling the external apparatus.

The method may further include performing the linkage service operation based on a control signal from the external apparatus.

The linkage service operation may include controlling a second external apparatus connected to the second server through the external apparatus.

The method may further include registering the second user account with the second server, based on a determination that the second user account obtained from the external apparatus has not been registered to the second server.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION OF EMBODIMENTS

Below, embodiments will be described in detail with reference to accompanying drawings. Further, the embodiments described with reference to the accompanying drawings are not exclusive to each other unless otherwise mentioned, and a plurality of embodiments may be selectively combined within one apparatus. The combination of these plural embodiments may be discretionally selected and applied by a person having an ordinary skill in the art.

In the description of the embodiments, an ordinal number used in terms such as a first element, a second element, etc. is employed for describing variety of elements, and the terms are used for distinguishing between one element and another element. Therefore, the meanings of the elements are not limited by the terms, and the terms are also used just for explaining the corresponding embodiment without limiting the disclosure.

Further, a term "at least one" among a plurality of elements in the disclosure represents not only all the elements but also each one of the elements, which excludes the other elements or all combinations of the elements.

Figure 1:
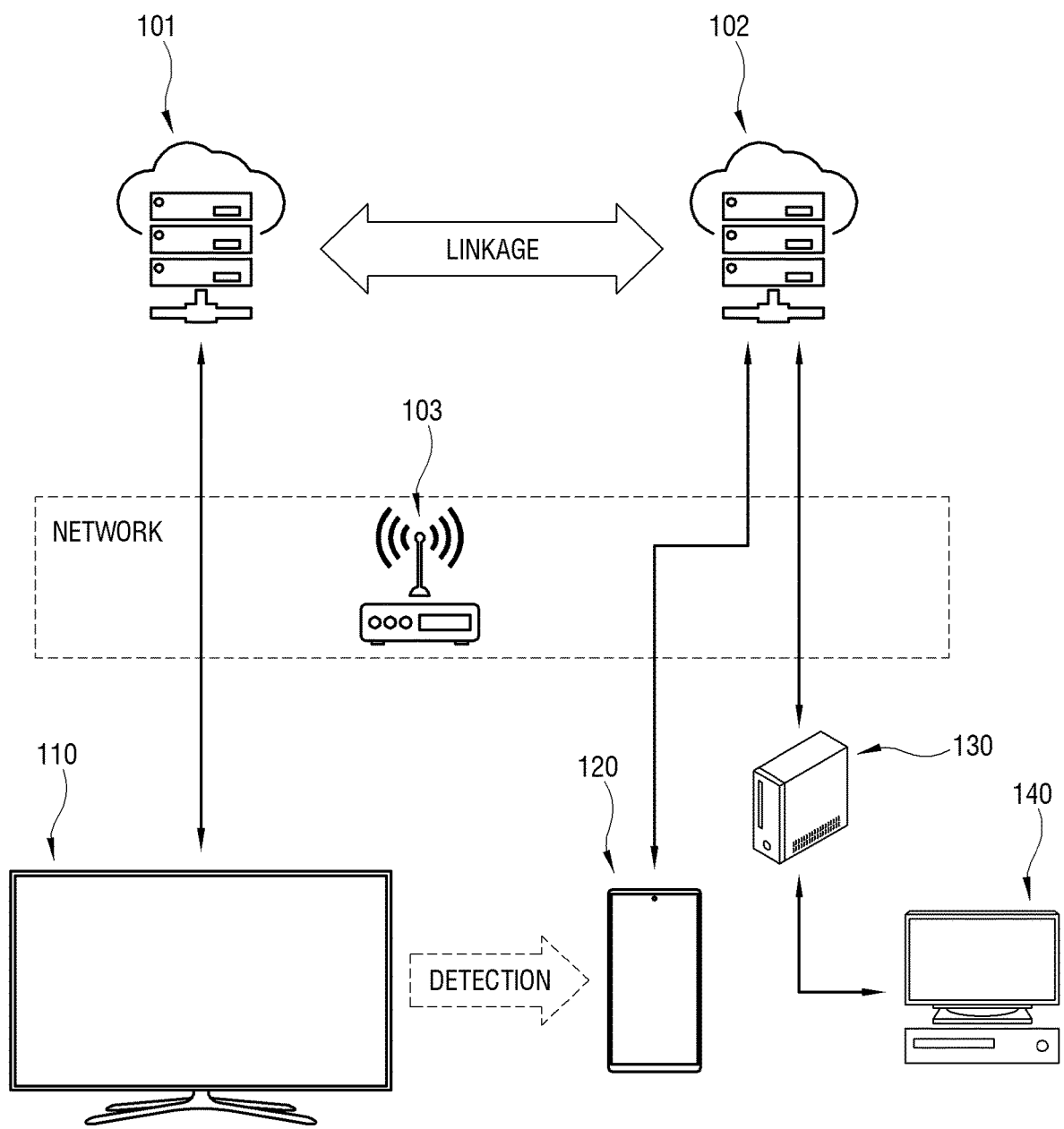
FIG. 1 illustrates a system connected to a plurality of servers, according to an embodiment.

FIG. 1 illustrates a system connected to a plurality of servers.

As shown in FIG. 1, a plurality of electronic apparatuses 110, 120, 130 and 140 are connected to communicate with each other through a network, and establish an Internet-of-things (IoT) environment. There are no limits to the kinds of electronic apparatuses 110, 120, 130 and 140, and the electronic apparatuses 110, 120, 130 and 140 may for example include a stationary display apparatus such as a television (TV), a monitor, a digital signage, a digital whiteboard, an electronic frame, etc.; an image processing apparatus such as a set-top box, an optical media player, etc.; an information processing apparatus such as a computer; a mobile apparatus such as a smartphone, a tablet computer, etc.; a wearable device, etc.

At least some among the plurality of electronic apparatuses 110, 120, 130 and 140 may be connected to a network. For example, each of the electronic apparatuses 110, 120, 130 and 140 can be connected to the network by Wi-Fi through an access point (AP) 103 connected to a gateway or router. According to system environments, some among the plurality of electronic apparatuses 110, 120, 130 and 140 may be connected to the network by a wired communication method, and they in this case may be connected to the gateway or router by a wire without the AP 103.

The electronic apparatuses 110, 120, 130 and 140 are registered with a user account to servers 101 and 102. Each of the electronic apparatuses 110, 120, 130 and 140 is logged in with the user account to the servers 101 and 102, and thus permitted to control operations of the other electronic apparatuses 110, 120, 130 and 140. There may be a plurality of servers 101 and 102. This embodiment shows two servers 101 and 102, i.e. a first server 101 and the second server 102, but three or more servers may be provided.

The servers 101 and 102 individually provide services, and manage user accounts to provide the corresponding services. As one of methods of managing the user account, the servers 101 and 102 store the user accounts and information about registration of one or more electronic apparatuses 110, 120, 130 and 140 that are linked to the corresponding user account. By retrieving the stored information about the registration, each of the servers 101 and 102 can identify the connected electronic apparatuses 110, 120, 130 and 140, the user account linked to the corresponding electronic apparatuses 110, 120, 130 and 140, and other electronic apparatuses 110, 120, 130 and 140 linked to the corresponding user account.

The electronic apparatuses 110, 120, 130 and 140 may be connected to the first server 101 or the second server 102 through the network. However, for a linked operation among the electronic apparatuses 110, 120, 130 and 140 under the IoT environment, each of the electronic apparatuses 110, 120, 130 and 140 needs to be connected to other electronic apparatuses 110, 120, 130 and 140 while being logged in the servers 101 and 102 to which it is registered. The linked operation between two of the electronic apparatuses 110, 120, 130 and 140 includes a case where two of the electronic apparatuses 110, 120, 130 and 140 are registered to one server 101 or 102, and a case where they are respectively registered to different servers 101 and 102.

For example, a linked operation between the electronic apparatus 120, which may be for example a mobile apparatus, and the electronic apparatus 130, which may be for example an image processing apparatus registered to the same second server 102 may be taken into account. The electronic apparatus 120 logs in to the second server 102 with the user account. The second server 102 identifies many apparatuses such as the electronic apparatus 130 linked to the user account logged in by the electronic apparatus 120. The second server 102 permits a control signal to be transmitted to the electronic apparatus 130, when it is identified that the control signal sent from the electronic apparatus 120 is targeted at or destined for the image processing apparatus 130 and the electronic apparatus 130 is linked to the user account. Thus, the electronic apparatus 130 receives the control signal from the electronic apparatus 120 via the second server 102, and performs an operation corresponding to the received control signal.

Meanwhile, a linked operation between the electronic apparatus 110, which may be for example a TV, registered to the first server 101 and the electronic apparatus 120 registered to the second server 102 may be taken into account. The electronic apparatus 110 logs in to the first server 101 with a predetermined first user account. The first server 101 identifies that the electronic apparatus 120, i.e. the target of the control signal sent from the electronic apparatus 110 is linked to (or linked to) a second user account corresponding to the first user account, and transmits the control signal to the second server 102 that manages the second user account.

When it is identified that the target of the control signal transmitted from the first server 101 is the electronic apparatus 120 linked to the second user account, the second server 102 permits the control signal to be transmitted to the electronic apparatus 120. Thus, the electronic apparatus 120 receives the control signal transmitted from the electronic apparatus 110 via the first server 101 and the second server 102, and performs an operation corresponding to the received control signal.

As above, the plurality of electronic apparatuses 110, 120, 130 and 140 may operate as linked to one another while being registered to the servers 101 and 102.

Meanwhile, at an initial point in time when the first server 101 registers the electronic apparatus 110 with the first user account and the second server 102 registers the electronic apparatus 120 with the second user account, the first user account and the second user account are not linked yet. Therefore, the electronic apparatus 110 may operate to link the first user account and the second user account together in the first server 101 or the second server 102 in response to a predetermined event. For example, this event may occur when the electronic apparatus 110 detects the electronic apparatus 120. In this regard, operations of the electronic apparatus 110 will be described later.

Below, elements of an electronic apparatus will be described.

Figure 2:
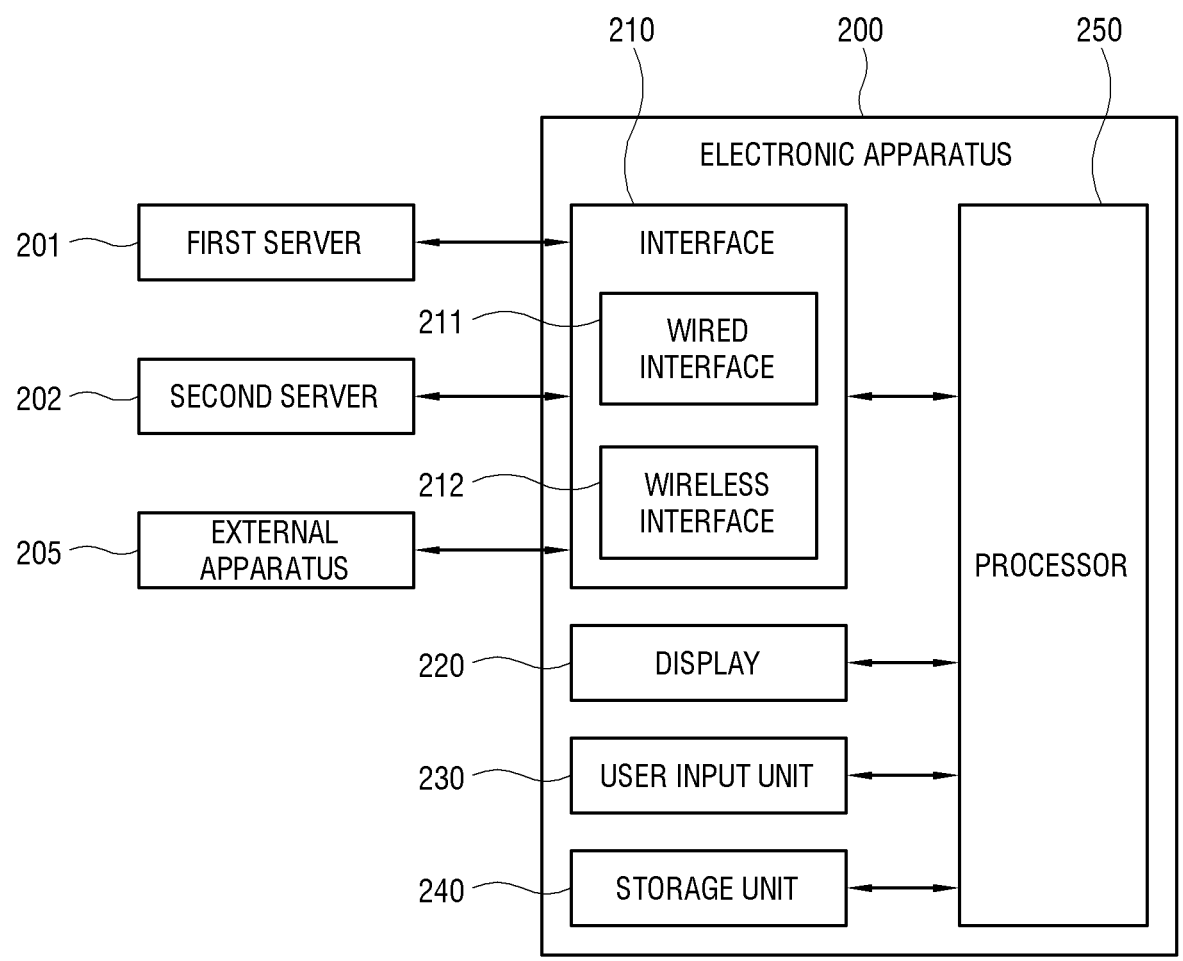
FIG. 2 is a block diagram of an electronic apparatus, according to an embodiment.

As shown in FIG. 2, an electronic apparatus 200 includes many hardware elements needed for operations. The elements included in the electronic apparatus 200 are not limited to only the following examples, but may include additional elements or exclude some elements as necessary when the electronic apparatus 200 is embodied. An external apparatus 205 basically includes hardware similar to that of the electronic apparatus 200 in this embodiment or a typical electronic apparatus, and thus detailed descriptions thereof will be omitted.

The electronic apparatus 200 may include an interface 210. The interface 210 includes an interface circuit through which the electronic apparatus 200 performs communication with various kinds of external apparatuses such as the external apparatus 205 and the servers 201 and 202 and transmits and receives data.

The interface 210 may include one or more wired interface 211 for wired communication. The wired interface 211 includes a connector or port to which a cable of previously defined transmission standards is connected. For example, the wired interface 211 includes a port connecting with a terrestrial or satellite antenna to receive a broadcast signal or connecting with a cable for cable broadcasting. Further, the wired interface 211 include ports to which cables of various wired transmission standards such as high definition multimedia interface (HDMI), DisplayPort (DP), digital video interactive (DVI), component, composite, S-video, thunderbolt, and the like to connect with various image processing apparatuses. Further, the wired interface 211 includes a port of universal serial bus (USB) standards to connect with a USB device. Further, the wired interface 211 includes an optical port to which an optical cable is connected. Further, the wired interface 211 includes an audio input port to which an external microphone is connected, and an audio output port to which a headset, an earphone, a loudspeaker etc. is connected. Further, the wired interface 211 includes an Ethernet port connected to a gateway, a router, a hub, etc. for connection with the WAN.

The interface 210 may include one or more wireless interface 212 for wireless communication. The wireless interface 212 includes an interactive communication circuit including at least one of elements such as a communication module, a communication chip, etc. corresponding to various kinds of wireless communication protocols. For example, the wireless interface 212 includes a Wi-Fi communication chip for wireless communication with the AP based on Wi-Fi; a communication chip for wireless communication based on Bluetooth, Zigbee, Z-Wave, WirelessHD, wireless gigabits (WiGig), near field communication (NFC), etc.; an infrared (IR) module for IR communication; a mobile communication chip for mobile communication with a mobile device; etc.

The electronic apparatus 200 may include the display 220. The display 220 includes a display panel capable of displaying an image on a screen thereof. The display panel may have a light receiving structure like a liquid crystal display (LCD) type, or a self-emissive structure like an organic light emitting diode (OLED) type. The display 220 may include an additional element according to the structures of the display panel. For example, when the display panel is of the LCD type, the display 220 includes an LCD panel, a backlight unit for illuminating the LCD panel, and a panel driving substrate for driving liquid crystal of the LCD panel.

The electronic apparatus 200 may include a user input unit 230. The user input unit 230 includes a circuit related to various input interfaces to be controlled by a user to thereby receive a user input. The user input unit 230 may be variously configured according to the kinds of electronic apparatus 200, and may for example include a mechanical or electronic button of the electronic apparatus 200, a touch pad, a sensor, a camera, and a touch screen installed in the display 220, a remote controller separated from the main body of the electronic apparatus 200, etc.

The electronic apparatus 200 may include a storage unit 240. The storage unit 240 is configured to store digitalized data. The storage unit 240 includes a nonvolatile storage in which data is retained regardless of whether power is supplied or not, and a volatile memory in which data loaded to be processed by a processor 250 is retained only when power is supplied. The storage includes a flash memory, a hard disc driver (HDD), a solid-state drive (SSD), a read only memory (ROM), etc., and the memory includes a buffer, a random-access memory (RAM), etc. The storage unit 240 in this embodiment may for example be configured to store a user account of the electronic apparatus 200, a manufacturer or a brand of the electronic apparatus 200, apparatus information, etc.

The electronic apparatus 200 may include the processor 250. The processor 250 includes one or more hardware processors achieved by a central processing unit (CPU), a chipset, a buffer, a circuit, etc. which are mounted on a printed circuit board (PCB). Alternatively, the processor 250 may be designed as a system on chip (SoC). The processor 250 includes modules corresponding to various processes of a demultiplexer, a decoder, a scaler, an audio digital signal processor (DSP), an amplifier, etc. Here, some or all of such modules may be achieved by the SoC. For example, a demultiplexer, a decoder, a scaler, and the like module related to an image process may be achieved as an image processing SoC, and an audio DSP may be achieved as a chipset separated from the SoC.

The processor 250 may perform registration to a first server 201 with a first user account previously stored in the storage unit 240 or input through the user input unit 230. In this case, the processor 250 can receive a predetermined service provided by the first server 201 by logging in to the first server 201 with the first user account.

Meanwhile, the processor 250 in this embodiment may identify a second server 202, to which a second user account of the external apparatus 205 is registered, when the external apparatus 205 is newly detected through the interface 210, and register the first user account to the second server 202 so that the first user account can be linked to the second user account. With this, the processor 250 performs a linked operation between the electronic apparatus 200 and the external apparatus 205.

Below, it will be described that the first user account registered to the first server 201 is registered to the second server 202 by the electronic apparatus 200.

Figure 3:
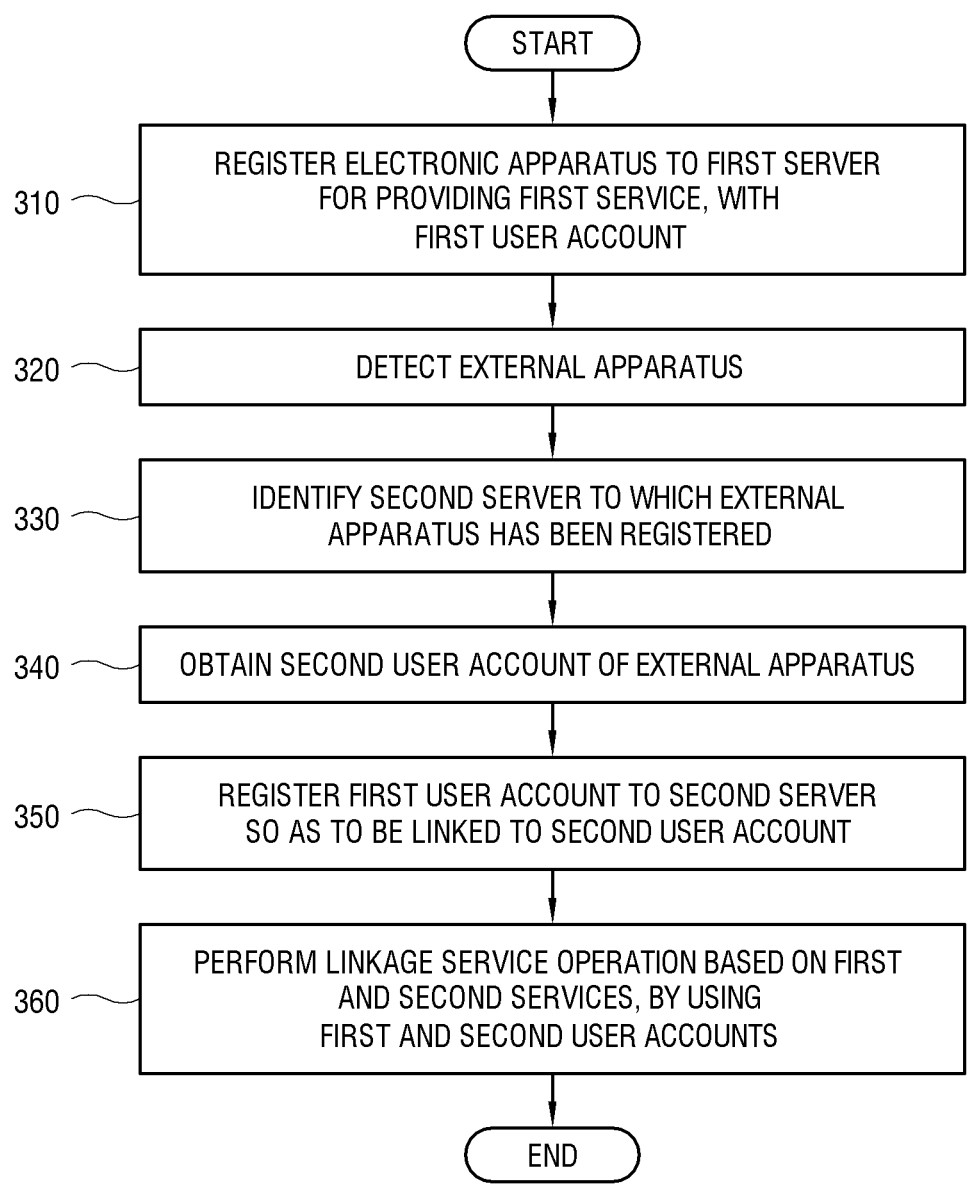
FIG. 3 is a flowchart showing an example in which an electronic apparatus registers a first user account to a second server so as to link the first user account with a second user account, according to an embodiment.

FIG. 3 is a flowchart showing that an electronic apparatus registers a first user account to a second server so as to link the first user account with a second user account.

As shown in FIG. 3, the following operations are performed or controlled by the processor of the electronic apparatus.

At operation 310 the electronic apparatus is registered to a first server with a first user account. Thus, the electronic apparatus can receive a first service from the first server by logging in to the first server with the first user account.

At operation 320 the electronic apparatus detects an external apparatus. The external apparatus refers to an apparatus registered to a second server different from the first server. Here, the electronic apparatus identifies the external apparatus based on information about the external apparatus received from the external apparatus. For example, the electronic apparatus may obtain information about the manufacturer of the external apparatus from the information about the external apparatus. Alternatively, the electronic apparatus may store a table of a manufacturer corresponding to a network address such as a media access control (MAC) address, and retrieve the manufacturer corresponding to the network address obtained from the information about the external apparatus from the table. In this way, the electronic apparatus can identify a model name, a manufacture, a brand, etc. of the external apparatus.

At operation 330 the electronic apparatus identifies the second server to which the external apparatus has been registered. For example, the electronic apparatus may identify that the external apparatus has been registered to the second server, based on the information received from the external apparatus.

At operation 340 the electronic apparatus obtains a second user account of the external apparatus.

At operation 350 the electronic apparatus registers the first user account to the second server so that the first user account can be linked to the second user account. In other words, the first user account registered to the first server and the second user account registered to the second server are linked together by the electronic apparatus. Here, the electronic apparatus identifies whether the first user account has already been registered to the second server, and then registers the first user account to the second server when it is identified that the first user account has not been registered to the second server yet.

At operation 360 the electronic apparatus may use the first user account and the second user account to perform a linkage service operation based on a first service provided by the first server and a second service provided by a second server.

Thus, when the external apparatus registered to the second server is detected, the electronic apparatus enables the first server and the second server to be interlinked with each other, thereby performing a linked operation with the external apparatus.

Meanwhile, this embodiment shows that the second external apparatus detected by the electronic apparatus has already been registered to the second server. However, it may also be taken into account that the detected second external apparatus has not been registered to the second server. In this case, the electronic apparatus may perform a process of registering the external apparatus to the second server with the second user account, on behalf of the external apparatus. A process of registering the first user account to be linked with the second user account may be performed after the foregoing process.

Meanwhile, the processor of the electronic apparatus may perform at least a part of data analysis, data process and result information generation based on at least one of machine learning, neural network, deep learning algorithms as a rule-based or artificial intelligence (AI) algorithm in order to perform operations of registering the electronic apparatus to the first server with the first user account, identifying the second server to which the external apparatus has been registered in response to detection of a new external apparatus in the IoT environment, and enabling a linked operation with the external apparatus by registering the first user account to the second server so that the first user account can be linked with the second user account of the external apparatus.

For example, the processor of the electronic apparatus may function as a learner and a recognizer. The learner may perform a function of generating the learned neural network, and the recognizer may perform a function of recognizing (or inferring, predicting, estimating and identifying) the data based on the learned neural network. The learner may generate or update the neural network. The learner may obtain learning data to generate the neural network. For example, the learner may obtain the learning data from the storage unit of the electronic apparatus or from the outside. The learning data may be data used for learning the neural network, and the data subjected to the foregoing operations may be used as the learning data to teach the neural network.

Before teaching the neural network based on the learning data, the learner may perform a preprocessing operation with regard to the obtained learning data or select data to be used in learning among a plurality of pieces of the learning data. For example, the learner may process the learning data to have a preset format, apply filtering to the learning data, or process the learning data to be suitable for the learning by adding/removing noise to/from the learning data. The learner may use the preprocessed learning data for generating the neural network which is set to perform the operations.

The learned neural network may include a plurality of neural networks (or layers). The nodes of the plurality of neural networks have weights, and the plurality of neural networks may be connected to one another so that an output value of a certain neural network can be used as an input value of another neural network. As an example of the neural network, there are a convolutional neural network (CNN), a deep neural network (DNN), a recurrent neural network (RNN), a restricted Boltzmann machine (RBM), a deep belief network (DBN), a bidirectional recurrent deep neural network (BRDNN) and deep Q-networks.

Meanwhile, the recognizer may obtain target data to carry out the foregoing operations. The target data may be obtained from the storage unit of the electronic apparatus or from the outside. The target data may be data targeted to be recognized by the neural network. Before applying the target data to the learned neural network, the recognizer may perform a preprocessing operation with respect to the obtained target data, or select data to be used in recognition among a plurality of pieces of target data. For example, the recognizer may process the target data to have a preset format, apply filtering to the target data, or process the target data into data suitable for recognition by adding/removing noise. The recognizer may obtain an output value output from the neural network by applying the preprocessed target data to the neural network. Further, the recognizer may obtain a stochastic value or a reliability value together with the output value.

Below, a method by which the electronic apparatus detects the external apparatus will be described.

Figure 4:
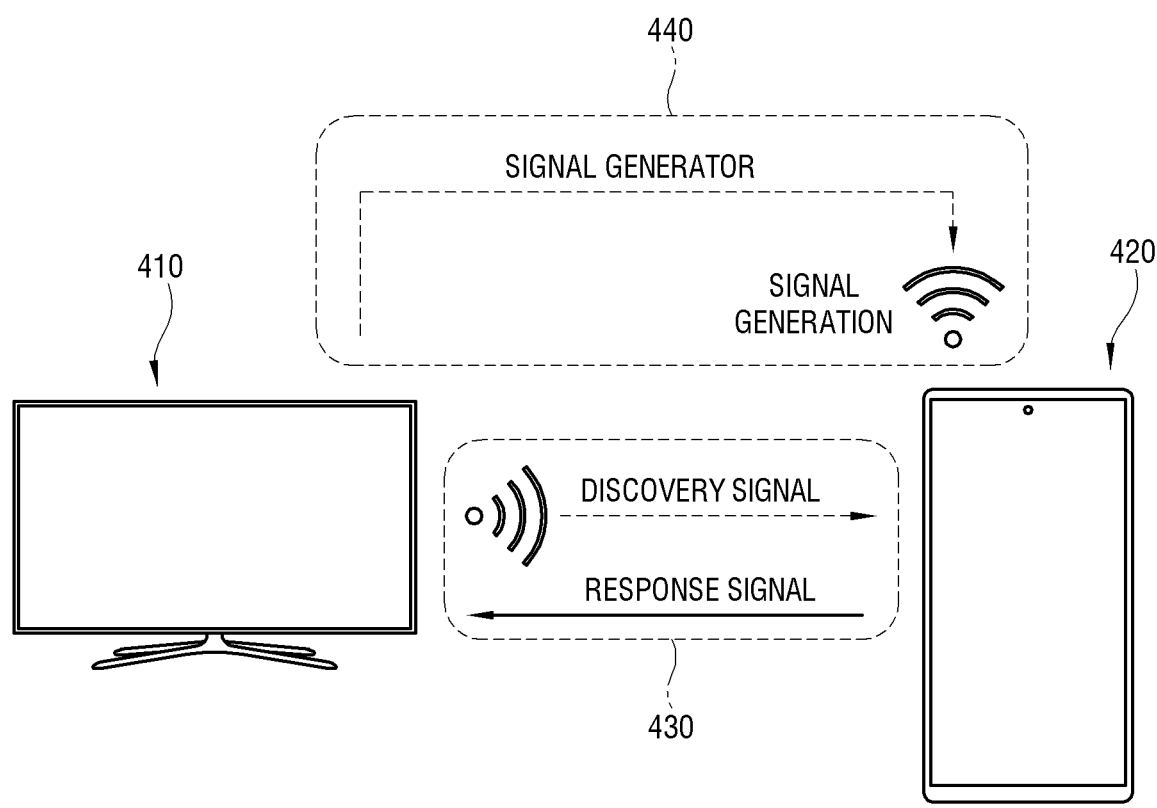
FIG. 4 illustrates an example in which an electronic apparatus detects an external apparatus, according to an embodiment.

FIG. 4 illustrates that an electronic apparatus detects an external apparatus.

As shown in FIG. 4, when an electronic apparatus 410 includes a wireless interface supporting Bluetooth (BT), Bluetooth low energy (BLE), or the like direct wireless communication, the electronic apparatus 410 may periodically broadcast a discovery signal such as a beacon signal. The discovery signal broadcasted by the electronic apparatus 410 is given to be detectable by various apparatuses placed within a preset distance range from the electronic apparatus 410. The discovery signal may include predetermined information about the electronic apparatus 410. The predetermined information may for example include identification information of the electronic apparatus 410, wireless communication standards supported by the electronic apparatus 410, etc.

When the discovery signal is based on the wireless communication standards supported by both the electronic apparatus 410 and an external apparatus 420, the external apparatus 420 can receive and recognize such a broadcasted discovery signal. The external apparatus 420 may transmit a response signal corresponding to the received discovery signal to the electronic apparatus 410, and performs a pairing process based on the wireless communication standards, thereby being paired with the electronic apparatus 410 for the wired communication.

The electronic apparatus 410 receives a response signal of the external apparatus 420 to the broadcasted discovery signal through the wireless interface, and thus identifies that the external apparatus 420 is detected (430). The response signal from the external apparatus 420 may for example include various pieces of information about the external apparatus 420, such as the apparatus information, brand, manufacturer, network-address information, etc. of the external apparatus 420. The electronic apparatus 410 can identify a server, to which the external apparatus 420 will be registered, based on such information from the external apparatus 420.

Alternatively, the electronic apparatus 410 may detect various signals generated in the external apparatus 420. The external apparatus 420 may for example generate a control signal for controlling other apparatuses, a communication signal to be transmitted to other apparatuses, or a discovery signal used by the external apparatus 420 for scanning other apparatuses. When the external apparatus 420 transmits such a signal by one of various methods such as broadcasting, etc., the electronic apparatus 410 can detect the corresponding signal.

Such a signal may include predetermined information about the external apparatus 420. Thus, the electronic apparatus 410 receives the signal from the external apparatus 420 through the wireless interface, and identifies that the external apparatus 420 is detected (440). Such a signal from the external apparatus 420 may be generated in the external apparatus 420 regardless of the electronic apparatus 410 (i.e. regardless of operations of the electronic apparatus 410, or without targeting the electronic apparatus 410), but the electronic apparatus 410 can recognize that the external apparatus 420 is detected based on information included in the corresponding signal.

Like this, the electronic apparatus 410 may detect the external apparatus 420 through the wireless interface. Alternatively, the electronic apparatus 410 may detect wired connection of the external apparatus 420 through a wired interface. For example, when a user connects a cable connecting with the external apparatus 420 to the wired interface of the electronic apparatus 410, the electronic apparatus 410 may detect the connection of the external apparatus 420 through the cable.

Below, a method by which an electronic apparatus and an external apparatus are registered to a server will be described.

Figure 5:
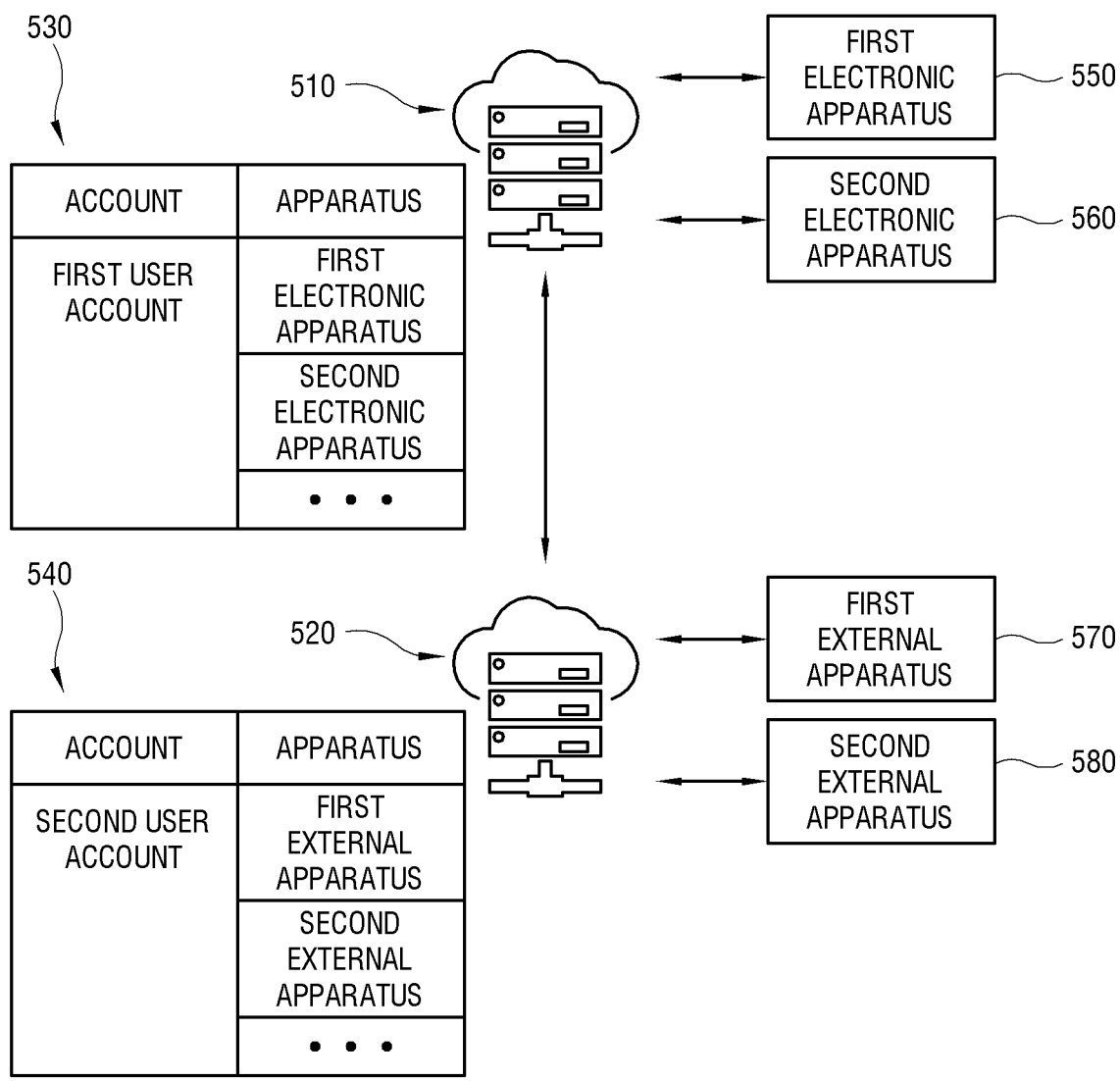
FIG. 5 illustrates an example in which a first server and a second server store registration information, according to an embodiment.

FIG. 5 illustrates that a first server and a second server store registration information.

As shown in FIG. 5, a first server 510 and a second server 520 manages user accounts and many electronic apparatuses. For example, the first server 510 stores first registration information 530 which includes a first user account and identification information about a first electronic apparatus 550 and a second electronic apparatus 560 under the first user account. Further, the second server 520 stores second registration information 540 which includes a second user account and identification information about a first external apparatus 570 and a second external apparatus 580 under the second user account. In this embodiment, terms of the electronic apparatus and the external apparatus are just given for convenience to distinguish between the plurality of apparatuses. Further, the first user account refers to an account to used for registration to the first server 510, and the second user account refers to an account to be used for registration to the second server 520.

When the first server 510 receives a registration request using the first user account from the first electronic apparatus 550 or the second electronic apparatus 560, the first server 510 registers the identification information of the first electronic apparatus 550 or the second electronic apparatus 560 under the first user account, thereby generating or updating the first registration information 530. On the sample principle, when the second server 520 receives a registration request using the second user account from the first external apparatus 570 or the second external apparatus 580, the second server 520 registers the identification information of the first external apparatus 570 or the second external apparatus 580 under the second user account, thereby generating or updating the second registration information 540.

In this state, a linked operation between the apparatuses registered to the same server will be described. For example, it will be assumed that the first electronic apparatus 550 and the second electronic apparatus 560 have been registered with the same first user account to the first server 510, and the first electronic apparatus 550 and the second electronic apparatus 560 are being logged in to the first server 510 with the first user account. When the first electronic apparatus 550 transmits a control signal for controlling the second electronic apparatus 560 to the first server 510, the first server 510 identifies that the corresponding control signal is transmitted from the first electronic apparatus 550 logged in with the first user account, and the corresponding control signal is targeted at the second electronic apparatus 560. When it is identified that the first registration information 530 shows the second electronic apparatus 560 has been registered under the same first user account, the first server 510 permits the control signal to be transmitted to the second electronic apparatus 560 so that the second electronic apparatus 560 can operate based on the control signal. When it is identified that the second electronic apparatus 560 has not been registered under the first user account, the first server 510 prohibits the control signal from being transmitted.

Like this, the linked operation using the first server 510, which may be for example a registration server, or 620 is possible between the first electronic apparatus 550 and the second electronic apparatus 560 registered to the same first server 510, or between the first external apparatus 570 and the second external apparatus 580 registered to the same second server 520. On the other hand, for a linked operation between the apparatuses registered to the different servers 510 and 620 (for example, between the first electronic apparatus 550 and the first external apparatus 570 or between the first electronic apparatus 550 and the second external apparatus 580), the first server 510 or the second server 520 need to take both the first registration information 530 and the second registration information 540 into account. Below, such an embodiment will be described.

Figure 6:
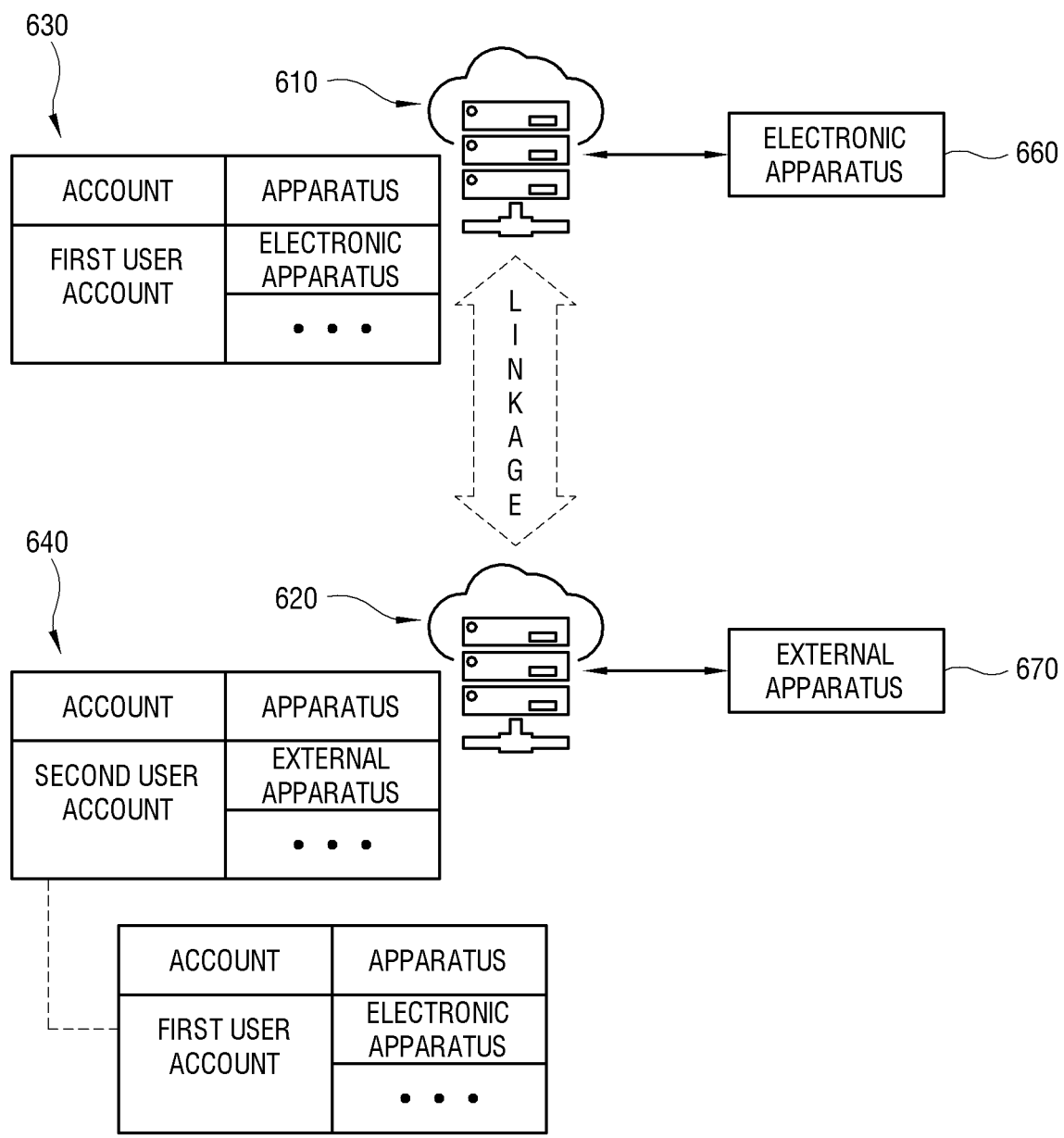
FIG. 6 illustrates a an example in which a second server manages user accounts when the second server is liked to a first server, according to an embodiment.

FIG. 6 illustrates a principle that a second server manages user accounts when the second server is liked to a first server.

As shown in FIG. 6, a first server 610 stores first registration information 630 prepared for managing a first user account, and a second server 620 stores second registration information 640 prepared for managing a second user account. An electronic apparatus 660 may use the first user account to receive a first service from the first server 610, and an external apparatus 670 may use a second user account to receive a second service from the second server 620. These are the same as described in the foregoing embodiments.

When the electronic apparatus 660 detects the external apparatus 670, the electronic apparatus 660 identifies the second server 620 to which the external apparatus 670 is registered with the second user account, and performs a process for registering the first user account to the second server 620 so that the first user account can be linked to the second user account. In this case, the second registration information 640 of the second server 620 is provided to manage both the second user account and the first user account corresponding to (i.e. linked to) the second user account. Further, the second registration information 640 may additionally include identification information of apparatuses linked to the user accounts, for example, the identification information of the external apparatus 670 linked to the second user account, and the identification information of the electronic apparatus 660 linked to the first user account.

Based on the second registration information 640, the second server 620 may offer a service linked to the first server 610. For example, it will be assumed that the external apparatus 670 transmits a control signal to the electronic apparatus 660 to thereby control operations of the electronic apparatus 660. The external apparatus 670 logs in with the second user account to the second server 620, and transmits the control signal targeted at the electronic apparatus 660 to the second server 620. When the electronic apparatus 660 targeted by the control signal does not belong to the second user account, the second server 620 identifies whether the electronic apparatus 660 belongs to the first user account linked to the second user account. When it is identified that the electronic apparatus 660 targeted by the control signal belongs to neither the second user account nor the first user account, the second server 620 prohibits the transmission of the control signal. On the other hand, when it is identified that the electronic apparatus 660 targeted by the control signal belongs to the first user account, the second server 620 manages the first user account and transmits the control signal to the first server 610 to which the electronic apparatus 660 is connected.

When it is identified that the control signal received from the second server 620 is targeted at the electronic apparatus 660 logged in with the first user account, the first server 610 transmits the control signal to the electronic apparatus 660. Thus, a linked operation between the electronic apparatus 660 and the external apparatus 670 respectively registered to the different servers 610 and 620.

Meanwhile, when the electronic apparatus detects the external apparatus, the external apparatus may not be registered to any server. In this case, the electronic apparatus may identify the second server designated to register the external apparatus, and register the external apparatus to the identified second server. Below, it will be described that the electronic apparatus registered to the first server registers a newly detected external apparatus to the second server.

Figure 7:
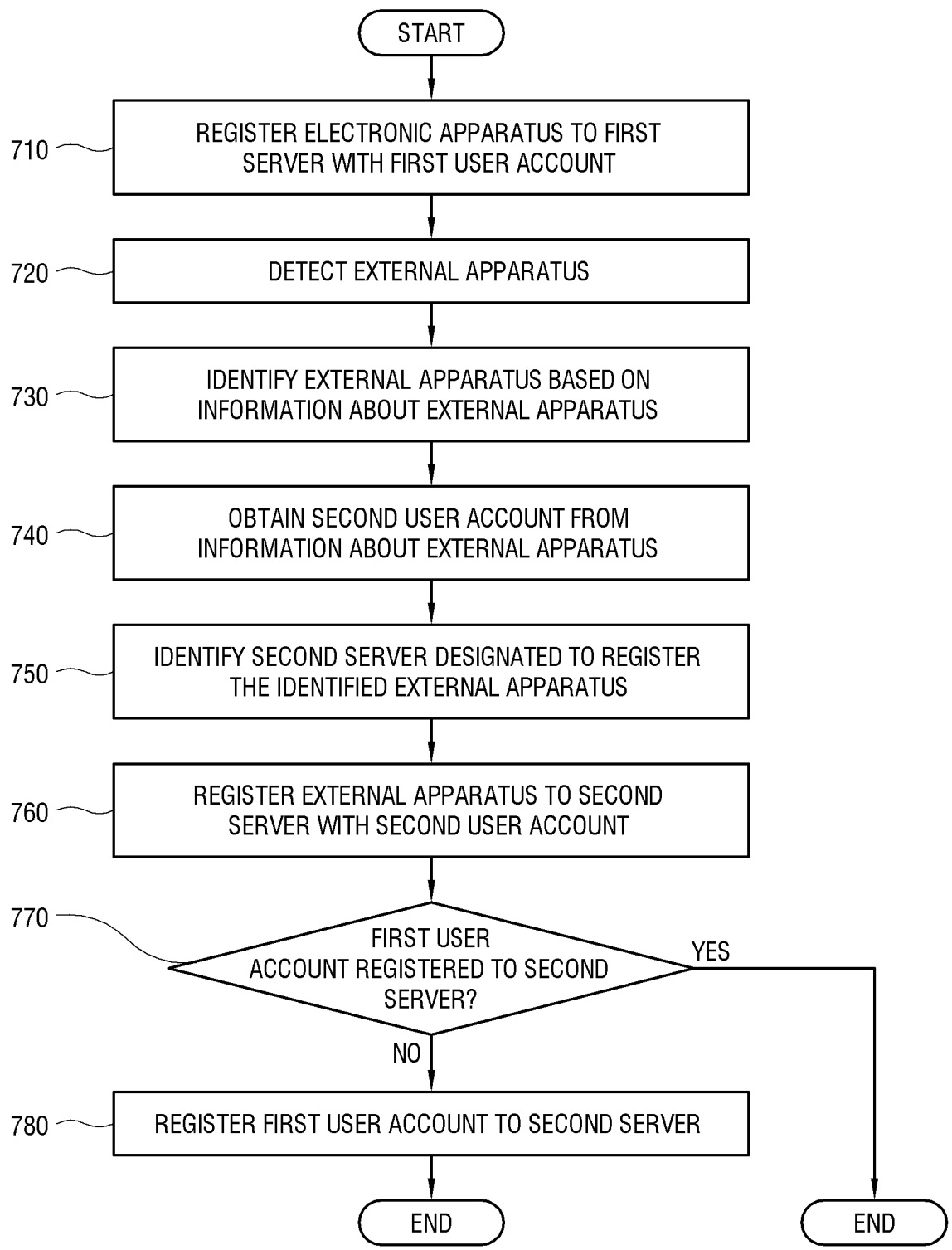
FIG. 7 is a flowchart showing a process that an electronic apparatus registered to a first server registers a newly detected external apparatus to a second server, according to an embodiment.

FIG. 7 is a flowchart showing a process that an electronic apparatus registered to a first server registers a newly detected external apparatus to a second server.

As shown in FIG. 7, the following operations are performed or controlled by the processor of the electronic apparatus.

At operation 710 the electronic apparatus is registered to the first server with a first user account.

At operation 720 the electronic apparatus detects the external apparatus.

At operation 730 the electronic apparatus identifies the external apparatus based on information about the external apparatus received from the external apparatus. For example, the electronic apparatus may obtain information about the manufacturer of the external apparatus from the information about the external apparatus. Alternatively, the electronic apparatus may store a table of a manufacturer corresponding to a network address such as a MAC address, and retrieve the manufacturer corresponding to the network address obtained from the information about the external apparatus from the table. In this way, the electronic apparatus can identify a model name, a manufacture, a brand, etc. of the external apparatus.

At operation 740 the electronic apparatus obtains a second user account from the information about the external apparatus received from the external apparatus. The second user account may be involved in the information about the external apparatus, or may be transmitted as separate information from the external apparatus to the electronic apparatus.

At operation 750 the electronic apparatus identifies the second server designated to register the identified external apparatus. For example, the electronic apparatus may identify the second server by receiving information for designating the second server from the external apparatus. Alternatively, when the manufacturer of the external apparatus is identified, the electronic apparatus may retrieve the second server corresponding to the identified manufacturer from a previously stored list or a database (DB).

At operation 760 the electronic apparatus registers the external apparatus to the second server with the second user account.

At operation 770 the electronic apparatus identifies whether the first user account has been registered to the second server. When it is identified that the first user account has been registered to the second server, the first user account and the second user account have already been linked with each other in the second server, and therefore the electronic apparatus does not perform an additional operation.

On the other hand, when it is identified that the first user account has not been registered to the second server, at operation 780 the electronic apparatus registers the unregistered first user account to the second server, thereby making the first user account be linked with the second user account.

Meanwhile, unlike the foregoing embodiment, the electronic apparatus may identify that the detected external apparatus is designated to be registered to the first server. In this case, the electronic apparatus transmits network information for connecting with the first server to the external apparatus. Thus, the external apparatus connects with the first server based on the network information received from the electronic apparatus, and performs a registration process in the first server. For example, the network information includes an SSID of an AP and a password of the AP when the electronic apparatus is connected to the first server through the AP. Alternatively, the electronic apparatus may transmit information about the first user account to the external apparatus when requested by the external apparatus. In the future, the electronic apparatus uses the first user account to perform an operation together with the external apparatus based on a first service. Because the electronic apparatus and the external apparatus have been registered to the first server under the first user account, the electronic apparatus can perform a first service-based operation linked with the external apparatus through the first server.

Below, operations of when the external apparatus controls the electronic apparatus will be described in detail.

Figure 8:
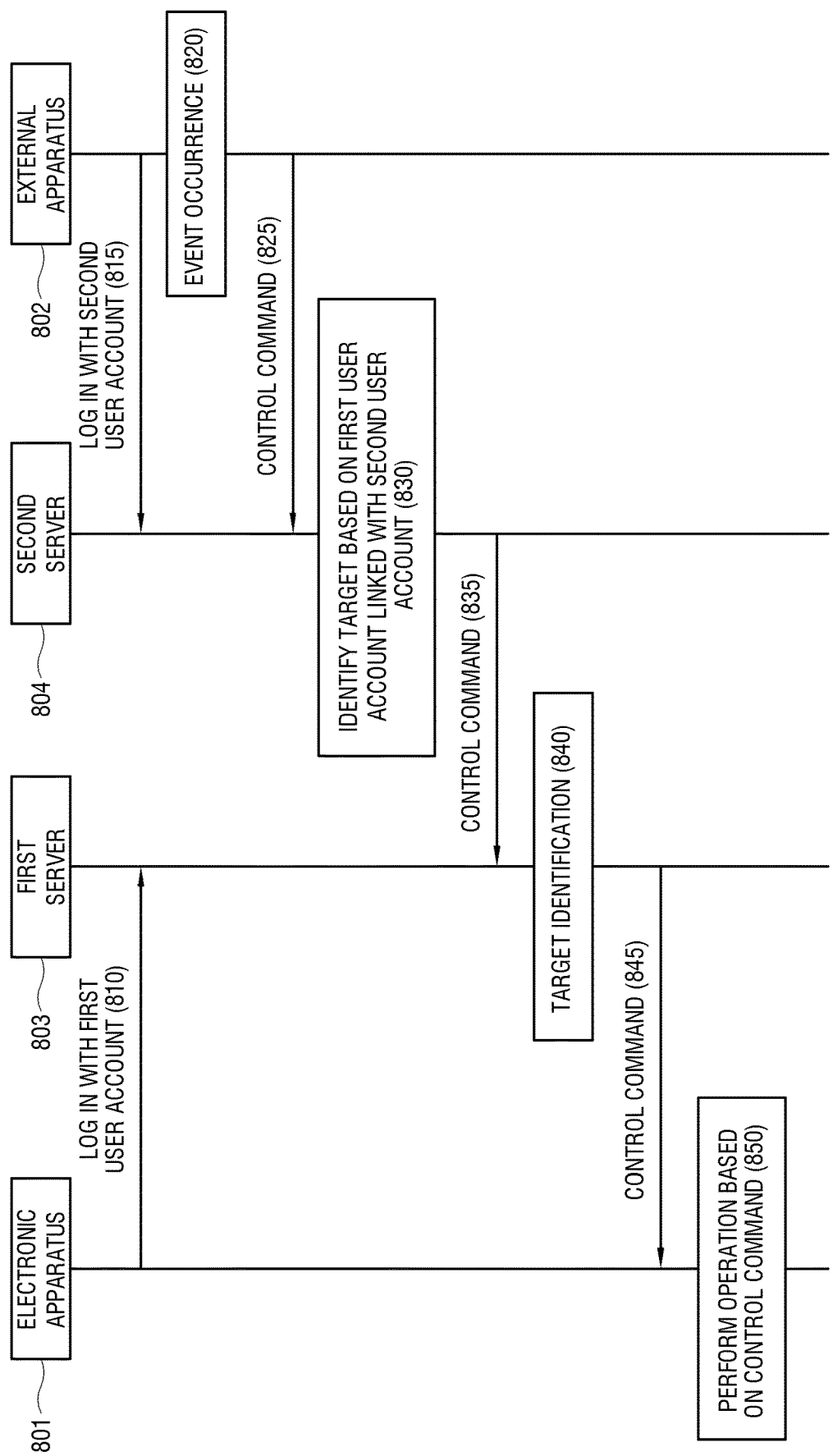
FIG. 8 illustrates an example in which an external apparatus registered to a second server controls an electronic apparatus registered to a first server, according to an embodiment.

FIG. 8 illustrates that an external apparatus registered to a second server controls an electronic apparatus registered to a first server.

As shown in FIG. 8, at operation 810 an electronic apparatus 801 logs in to a first server 803 with a first user account. At operation 815 an external apparatus 802 logs in to a second server 804 with a second user account. The second server 804 stores linkage information between user accounts, i.e. registration information for designating linkage between the second user account and the first user account.

At operation 820 an event previously defined in the external apparatus 802 occurs. In response to the event, at operation 825 the external apparatus 802 transmits a control command for the electronic apparatus 801 to the second server 804. The control command includes information about a target to which the corresponding control command will be transmitted.

At operation 830 the second server 804 identifies the target of the received control command, based on the first user account linked with the second user account. In other words, the second server 804 identifies that the control command is targeted at the electronic apparatus 801, and the electronic apparatus 801 belongs to the first user account designated to be link to the second user account. At operation 835 the second server 804 transmits the control command to the first server 803 based on identification results.

At operation 840 the first server 803 identifies the target of the control command received from the second server 804. At operation 845 the first server 803 transmits the control command to the electronic apparatus 801 based on identification results. Because the control command received in the first server 803 is targeted at the electronic apparatus 801 registered with the first user account, it is possible to identify the target in this process even though the first server 803 does not necessarily have the linkage information about the user account.

At operation 850 the electronic apparatus 801 performs an operation based on the control command received from the first server 803.

Below, detailed operations of when the electronic apparatus controls the external apparatus will be described.

Figure 9:
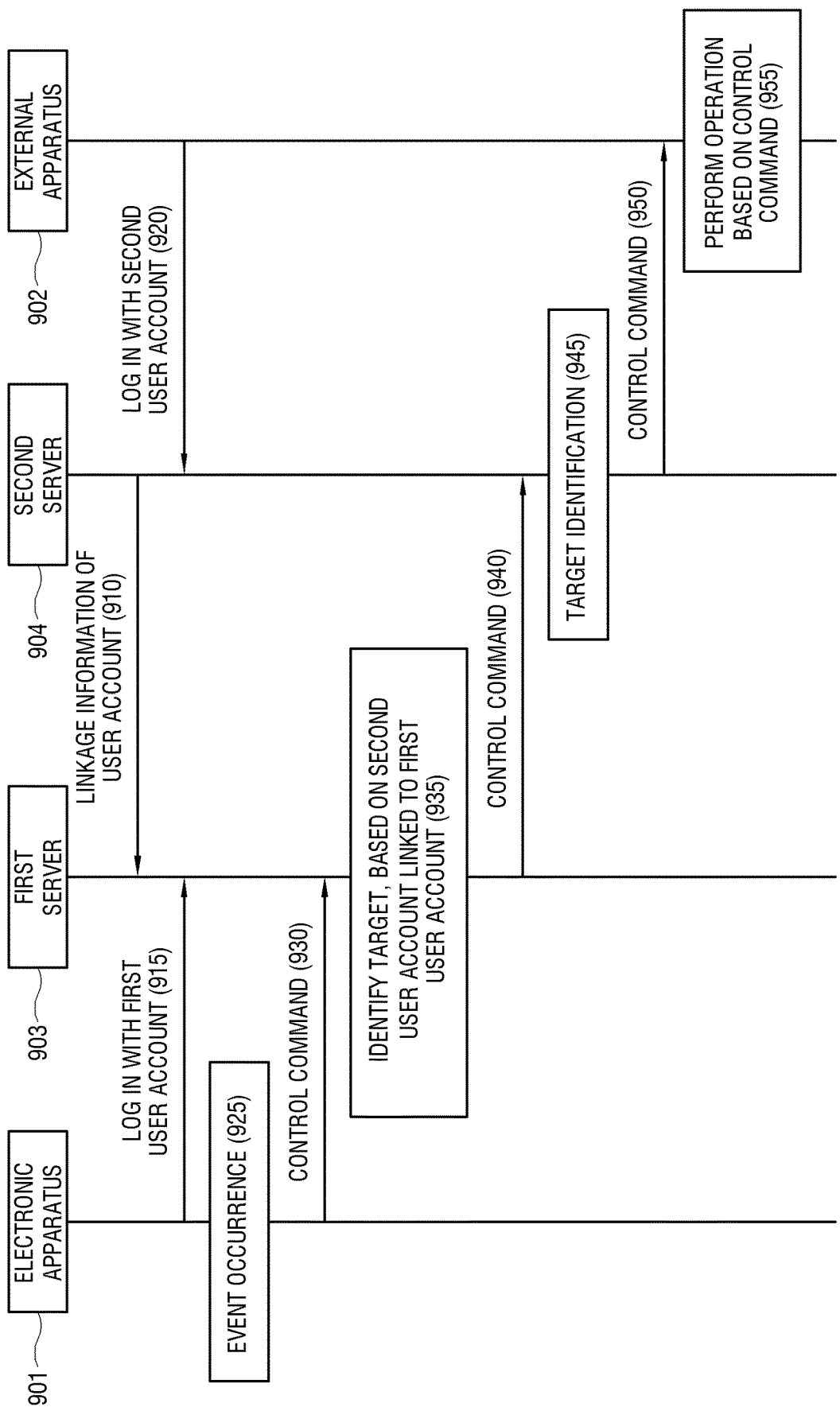
FIG. 9 illustrates an example in which an electronic apparatus registered to a first server controls an external apparatus registered to a second server, according to an embodiment.

FIG. 9 illustrates that an electronic apparatus registered to a first server controls an external apparatus registered to a second server.

As shown in FIG. 9, at operation 910 a second server 904 provides linkage information of a user account to a first server 903. Although an electronic apparatus 901 registers a first user account to the second server 904 so as to be linked to a second user account, the second server 904 may share the linkage information of the user account with the first server 903. Thus, the first server 903 may link and manage the first user account and the second user account together like the second server 904.

At operation 915 the electronic apparatus 901 logs in to the first server 903 with the first user account. At operation 920 an external apparatus 902 logs in to the second server 904 with the second user account.

At operation 925 an event previously defined in the electronic apparatus 901 occurs. In response to the event, at operation 930 the electronic apparatus 901 transmits the control command for the external apparatus 902 to the first server 903.

At operation 935 the first server 903 identifies the target of the received control command, based on the second user account linked to the first user account. In other words, the first server 903 identifies that the control command is targeted at the external apparatus 902, and the external apparatus 902 belongs to the second user account designated to be linked to the first user account. At operation 940 the first server 903 transmits the control command to the second server 904 based on identification results.

At operation 945 the second server 904 identifies the target of the control command received from the first server 903. At operation 950 the second server 904 transmits the control command to the external apparatus 902 based on identification results.

At operation 955 the external apparatus 902 performs an operation based on the control command received from the second server 904.

Meanwhile, the foregoing embodiments show the electronic apparatus registered to the first server with the first user account and the external apparatus registered to the second server with the second user account. However, when the external apparatus serves as a kind of hub, the external apparatus may connect with another external apparatus. Below, such an embodiment will be described.

Figure 10:
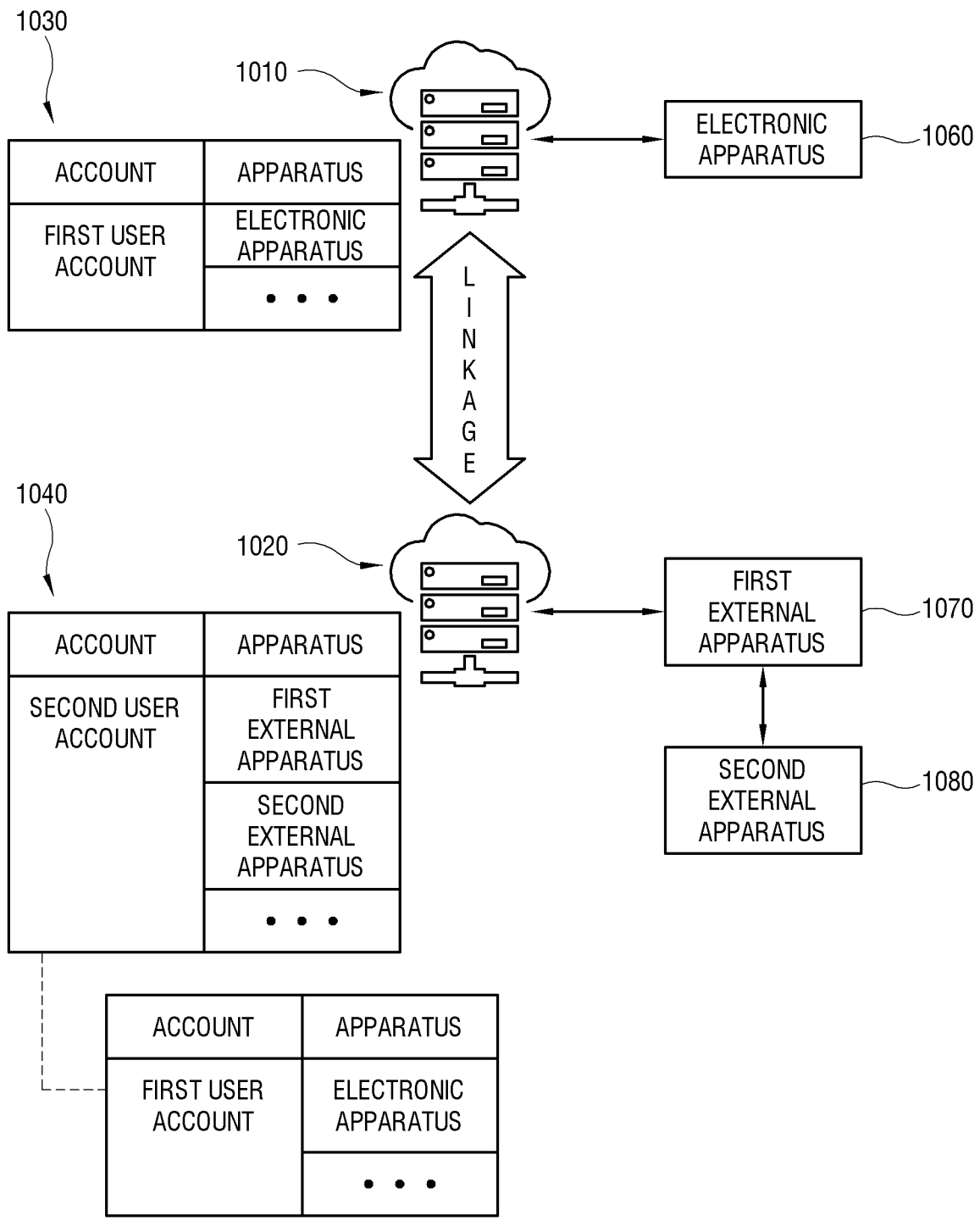
FIG. 10 illustrates an example in which a second server manages user accounts when the second server is linked to a first server, according to an embodiment.

FIG. 10 illustrates a principle that a second server manages user accounts when the second server is linked to a first server.

As shown in FIG. 10, a first server 1010 stores first registration information 1030 given to manage a first user account, and a second server 1020 stores second registration information 1040 given to manage a second user account. An electronic apparatus 1060 can use the first user account to receive a first service from the first server 1010, and a first external apparatus 1070 can use the second user account to receive a second service from the second server 1020.

In this embodiment, the first external apparatus 1070 connects with a second external apparatus 1080, and the second external apparatus 1080 is provided to communicate with the second server 1020 through the first external apparatus 1070. The second external apparatus 1080 may receive the service from the second server 1020 by using the second user account like the first external apparatus 1070.

Like a case where the first external apparatus 1070 is registered to the second server 1020 with the second user account, the second external apparatus 1080 may also be registered to the second server 1020 with the second user account.

The second registration information 1040 is designated to allow the first user account to be linked with the second user account. This is the same as described in the foregoing embodiment. Further, according to the second registration information 1040, the first external apparatus 1070 and the second external apparatus 1080 have been registered under the second user account, and therefore the second server 1020 can manage the second external apparatus 1080 like a case of the first external apparatus 1070. However, the second external apparatus 1080 is connected to the first external apparatus 1070, and thus a signal between the second server 1020 and the second external apparatus 1080 is transmitted via the first external apparatus 1070.

A process that the second external apparatus 1080 transmits a control signal to the electronic apparatus 1060 is as follows. When a predetermined event occurs in the second external apparatus 1080, the second external apparatus 1080 transmits the control signal to the first external apparatus 1070. The first external apparatus 1070 transmits the received control signal to the second server 1020.

The second server 1020 identifies that the control signal is targeted at the electronic apparatus 1060 under the first user account based on the second registration information 1040. The second server 1020 transmits the control signal to the first server 1010.

The first server 1010 identifies that the control signal is targeted at the electronic apparatus 1060, and transmits the control signal to the electronic apparatus 1060. Thus, the electronic apparatus 1060 can perform an operation based on the control signal from the second external apparatus 1080.

The operations of the apparatus described in the foregoing embodiments may be performed by artificial intelligence provided in the corresponding apparatus. The artificial intelligence may be applied to various general systems by utilizing a machine learning algorithm. An artificial intelligence system refers to a computer system with intelligence of a human or being second to a human. In such a system, a machine, an apparatus or a system autonomously performs leaning and identifying and is improved in accuracy of recognition and identification based on accumulated experiences. The artificial intelligence is based on elementary technology by utilizing machine learning technology and algorithms based on an algorithm of autonomously classifying and learning features of input data, and copying perception, identification and the like functions of a human brain.

The elementary technology may for example include at least one of language comprehension technology for recognizing a language and a text of a human, visual understanding technology for recognizing a thing like a human sense of vision, inference and prediction technology for identifying information and logically making inference and prediction, knowledge representation technology for processing experience information of a human into knowledge data, and motion control technology for controlling a vehicle's automatic driving or a robot's motion.

Here, linguistic comprehension refers to technology of recognizing, applying and processing a human's language or text, and includes natural language processing, machine translation, conversation system, question and answer, voice recognition and synthesis, etc.

Inference and prediction refer to technology of identifying information and logically making prediction, and includes knowledge- and probability-based inference, optimized prediction, preference-based plan, recommendation, etc.

Knowledge representation refers to technology of automating a human's experience information into knowledge data, and includes knowledge building such as data creation and classification, knowledge management such as data utilization, etc.

The methods according to the foregoing embodiments may be achieved in the form of a program instruction that can be implemented in various computers, and recorded in a computer readable medium. Such a computer readable medium may include a program instruction, a data file, a data structure or the like, or combination thereof. For example, the computer readable medium may be stored in a nonvolatile storage unit such as universal serial bus (USB) memory, regardless of whether it is deletable or rewritable, for example, a RAM, a ROM, a flash memory, a memory chip, an integrated circuit (IC) or the like memory, or an optically or magnetically recordable or machine (e.g., a computer)-readable storage unit medium, for example, a compact disk (CD), a digital versatile disk (DVD), a magnetic disk, a magnetic tape or the like. It will be appreciated that a memory, which can be included in a mobile terminal, is an example of the machine-readable storage unit medium suitable for storing a program having instructions for realizing the embodiments. The program instruction recorded in this storage unit medium may be specially designed and configured according to the embodiments, or may be publicly known and available to those skilled in the art of computer software. Further, the computer program instruction may be implemented by a computer program product.

Although a few embodiments have been shown and described, it will be appreciated by those skilled in the art that changes may be made in these embodiments without departing from the scope as defined in the appended claims and their equivalents.

What is claimed is:

1. An electronic apparatus comprising:
   at least one interface; and
   at least one processor configured to:
   register a first user account with a first server configured to provide a first service, through the at least one interface,
   in response to detecting an external apparatus through the at least one interface, obtain information from the external apparatus, wherein the information includes a second user account registered, by the external apparatus, in a second server configured to provide a second service different from the first service,
   connect to the second server using the second user account through the at least one interface,
   register the first user account with the second server to link the first user account to the second user account, and
   perform a linkage service operation based on the first service and the second service, using the first user account and the second user account.

2. The electronic apparatus according to claim 1, wherein the at least one processor is further configured to:
   detect the external apparatus through the at least one interface,
   determine whether the first user account has been registered with the second server, and
   based on determining that the first user account is not registered with the second server, register the first user account with the second server.

3. The electronic apparatus according to claim 2, wherein the at least one processor is further configured to:
   identify the external apparatus based on information about the external apparatus received from the external apparatus through the at least one interface.

4. The electronic apparatus according to claim 3, wherein the information about the external apparatus comprises information about a manufacturer of the external apparatus, and
   wherein the at least one processor is further configured to identify the external apparatus based on the information about the manufacturer of the external apparatus.

5. The electronic apparatus according to claim 4, wherein the information about the external apparatus further comprises a network address of the external apparatus, and
   the at least one processor is further configured to identify the external apparatus based on the network address of the external apparatus and a network address table provided according to the manufacturer of the external apparatus.

6. The electronic apparatus according to claim 1, wherein the at least one processor is further configured to:
   receive information about the second server from the external apparatus through the at least one interface, and
   identify the second server based on the received information about the second server.

7. The electronic apparatus according to claim 1, wherein the linkage service operation comprises controlling the external apparatus.

8. The electronic apparatus according to claim 1, wherein the at least one processor is further configured to perform the linkage service operation based on a control signal received from the external apparatus.

9. The electronic apparatus according to claim 1, wherein the linkage service operation comprises controlling a second external apparatus connected to the second server through the external apparatus.

10. The electronic apparatus according to claim 1, wherein the at least one processor is further configured to register the external apparatus with the second server through the at least one interface, based on a determination that the external apparatus has not been registered to the second server.

11. A method of controlling an electronic apparatus, comprising:
   registering a first user account with a first server configured to provide a first service;
   in response to detecting an external apparatus, obtain information from the external apparatus, wherein the information includes a second user account registered, by the external apparatus, in a second server configured to provide a second service different from the first service;
   connecting to the second server using the second user account registering the first user account with the second server to link the first user account to the second user account; and performing a linkage service operation based on the first service and the second service, using the first user account and the second user account.

12. The method according to claim 11, further comprising:
   detecting the external apparatus;
   determining whether the first user account has been registered with the second server; and
   based on determining that the first user account is not registered with the second server, registering the first user account with the second server.

13. The method according to claim 12, further comprising:
   identifying the external apparatus based on information about the external apparatus received from the external apparatus.

14. The method according to claim 13, wherein the information about the external apparatus comprises information about a manufacturer of the external apparatus, and
   wherein the external apparatus is identified based on the information about the manufacturer of the external apparatus.

15. The method according to claim 14, wherein the information about the external apparatus further comprises a network address of the external apparatus, and
   wherein the external apparatus is identified based on the network address of the external apparatus and a network address table provided according to the manufacturer of the external apparatus.

16. The method according to claim 11, further comprising:
   receiving information about the second server from the external apparatus, and
   identifying the second server based on the received information about the second server.

17. The method according to claim 11, further comprising the linkage service operation comprises controlling the external apparatus.

18. The method according to claim 11, further comprising performing the linkage service operation based on a control signal from the external apparatus.

19. The method according to claim 11, wherein the linkage service operation comprises controlling a second external apparatus connected to the second server through the external apparatus.

20. The method according to claim 11, further comprising registering the external apparatus with the second server, based on a determination that the external apparatus has not been registered to the second server.

* * * * *